(No Model.)
A. WURTS.
LIGHTNING ARRESTER.
No. 492,549. Patented Feb. 28, 1893.
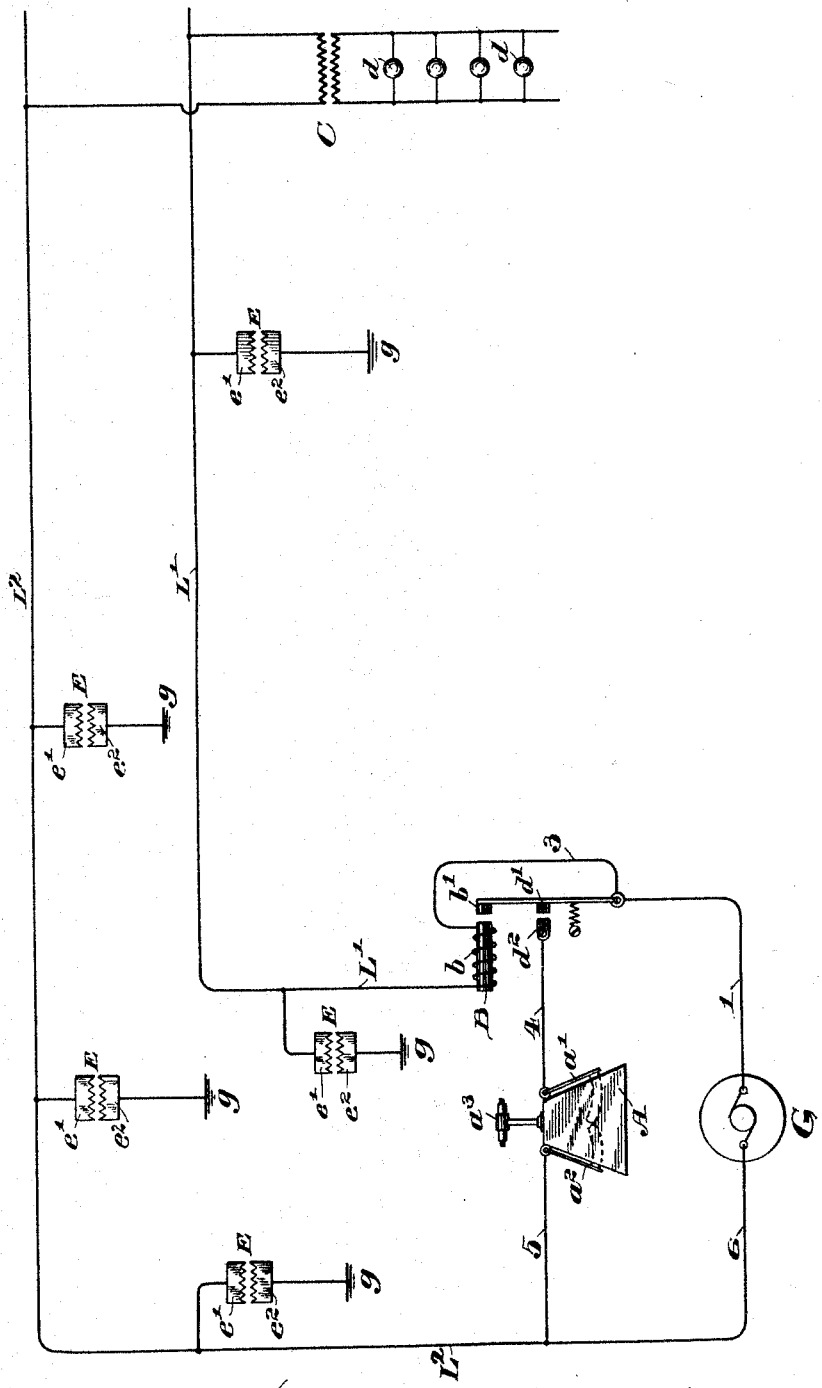
Witnesses  Alexander Wurts — Inventor
By his Attorney H. S. MacKaye
THE NORRIS PETERS CO., PHOTO-LITHO., WASHINGTON, D. C.

UNITED STATES PATENT OFFICE.

ALEXANDER WURTS, OF PITTSBURG, PENNSYLVANIA, ASSIGNOR TO THE WESTINGHOUSE ELECTRIC AND MANUFACTURING COMPANY, OF SAME PLACE.

LIGHTNING-ARRESTER.

SPECIFICATION forming part of Letters Patent No. 492,549, dated February 28, 1893.

Application filed August 29, 1892. Serial No. 444,400. (No model.)

*To all whom it may concern:*

Be it known that I, ALEXANDER WURTS, a citizen of the United States, residing at Pittsburg, in the county of Allegheny and State of Pennsylvania, have invented a certain new and useful Improvement in Lightning-Arresters, (Case No. 501,) of which the following is a specification.

The invention relates to certain improvements in apparatus for protecting electric machines and circuits from injury by reason of lightning discharges.

Heretofore it has been customary to provide extended electric circuits with lightning discharge circuits which permit excessive potentials to escape from the line to earth. It frequently happens that the arcs formed by such discharge of the circuits afford a path for the generated or dynamo current to follow and therefore result in a short-circuit of the machine. It is desirable to avoid such short-circuit and it has therefore been customary heretofore to provide each lightning discharge device with a circuit interrupter which will open the circuit or extingush the arc immediately upon the passage of the lightning discharge. The present invention aims to simplify such an organization and lessen its cost and at the same time more effectively protect the circuits and generator.

The invention consists in equipping the circuit with a large number of lightning discharge plates or lightning arresters, and providing a single short-circuiting and circuit interrupting device for all of the lightning arresters; that is to say, for the entire circuit. Such an organization will permit the economical use of a very large number of simple lightning arresters, so that they may be located at frequent intervals throughout the circuit, and at the same time insure the automatic opening of the circuit of the dynamo after the discharge has taken place in the event that the dynamo current should seek to follow the lightning discharge.

The invention will be described more in detail in connection with the accompanying drawing, which is a diagram illustrating an organization of apparatus for carrying out the invention.

Referring to the figure, G represents a source of electric currents of any suitable character, and $L'$, $L^2$, its circuit.

At C I have represented a work-circuit, in this instance consisting of one or more converters having their primaries connected with the circuit $L'$, $L^2$, and their secondaries connected with translating devices, such as incandescent lamps $d$. Any form of work-circuit, however, may be employed.

At intervals along the line are placed lightning arresters E. These have one plate $e'$ connected with conductors of the main circuit, and the other plate $e^2$ connected with the earth at $g$. This lightning arrester may be of any suitable character. A lightning discharge or a high potential produced upon the circuit $L'$, $L^2$, by reason of atmospheric disturbances, will escape to earth across the intervening air-gap between the plates $e'$, $e^2$, of one or more of the lightning arresters. Such an electric discharge, however, forms arcs across the spaces between the plates, and thus frequently affords a path for the flow of the current delivered by the generator G. It is necessary, therefore, that means be provided for immediately interrupting the circuit or extinguishing the arc. This I accomplish by first short-circuiting the generator independently of any or all of the lightning arresters, and then immediately interrupting the short-circuit. This may be accomplished by means of an electro-magnet or solenoid B, the coil $b$ of which is included in some portion of the main circuit, as, for instance, in the conductor $L'$, the circuit being from the generator G through conductors 1 and 3 to the coils $b$, and thence to the line $L'$. This electro-magnet is provided with an armature $b'$, which is carried upon a lever $d'$, and is normally held away from the electro-magnet in any suitable manner. When, however, an excessive current, such, for instance, as is caused by the dynamo through the lightning arresters, traverses the coil $b$, the armature $b'$ will respond and be drawn toward the core. A contact point $d'$ carried by the lever of the armature $b'$ is then brought against a contact $d^2$. A conductor 4 connects this contact with one electrode $a'$ of a circut interrupter A. The other electrode $a^2$ of this circuit interrupter is connected by a conductor 5 with the conductor 6, which leads from the dynamo G to the conductor $L^2$. When, therefore, the armature $b'$ is drawn forward by reason of an excessive current traversing the circuit, a short circuit for the dynamo will be closed through the conductor 1, the contact points $d'$, $d^2$, the conductor 4, the circuit-interrupting device A and the conductors 5 and 6. The two electrodes $a^2$, and $a'$, are indicated as resting in contact with each other, within a closed box or case, and therefore a closed circuit will be formed for the dynamo, the resistance of which is far less than that offered by the path through the arcs formed at the lightning arresters, therefore the current will be practically withdrawn from the lightning arresters and thus the arcs interrupted; but the circuit interrupter A operates automatically to immediately interrupt its own circuit. Meanwhile the drawing off of the current from the main circuit $L'$, $L^2$, through the coil $b$ will allow the armature $b'$ to fall back, thus opening at $d'$, $d^2$, the short circuit which was formed through the circuit interrupter, and thus the system will be restored to its normal condition.

In some instances it may not be necessary to employ the circuit interrupter A for the reason that the short-circuit of the machine will cut off the current from the electro-magnet B and then automatically interrupt the circuit at $d'$, $d^2$, provided this magnet is located beyond the point $d'$.

The operation of the circuit interrupter A, which is indicated in the drawing, is as follows: The current flowing from the electrode $a'$, $a^2$, produces heat within the inclosing case, and this tends to cause a sudden rush of air outward through the parts which receive the electrodes, thus forcing the electrodes outward and apart. These electrodes are pivoted and strike against the buffer $a^3$, and then return to their normal positions and are in condition to again interrupt a circuit when formed through them.

Any other suitable form of automatic circuit interrupter may be substituted for that shown at A.

I claim as my invention—

1. The combination with a source of electric currents and its circuits, of lightning arresters or discharge points distributed throughout a portion or all of the circuit, and an automatic circuit closing and interrupting device for short-circuiting the source and interrupting the short-circuit thus formed, substantially as described.

2. The combination with an electric generator and its circuit, of lightning arresters for relieving the circuit of lightning charges, and an automatic circuit interrupting device for interrupting the arcs of any or all of the lightning discharge devices.

3. In a system of electrical distribution, the combination with a source of electric currents, main line lightning arresters therefor, a normally opened shunt circuit around said source, automatically operating devices for closing said circuit upon the flow of an abnormal current, and an automatic circuit-interrupting device in said short circuit operated by the flow of abnormal currents therethrough to interrupt said short-circuit.

4. In a system of electrical distribution the combination with a source of electric currents and its circuits of lightning arresters located at intervals throughout the circuit, a normally opened short-circuit for the machine, means for closing the short-circuit upon the flow of an abnormal current through any of the lightning arresters and automatically interrupting said short-circuit by reason of the flow of current therethrough, substantially as described.

5. The combination with a source of electric currents and its circuit, of a system of lightning arresters for said circuit, an electro-magnetic circuit closer included in said circuit and responding to currents of abnormal strength, a short-circuit closed by the operation of said circuit-closer, and an automatic circuit interrupting device located in said short-circuit responding to currents of abnormal strength therethrough.

In testimony whereof I have hereunto subscribed my name this 27th day of August, A. D. 1892.

ALEXANDER WURTS.

Witnesses:
JAMES WM. SMITH,
HAROLD S. MACKAYE.